United States Patent
DeCusatis et al.

(10) Patent No.: US 9,253,026 B2
(45) Date of Patent: Feb. 2, 2016

(54) SOFTWARE-DEFINED NETWORKING DISASTER RECOVERY

(71) Applicant: International Business Machines Corporation, Armonk, NY (US)

(72) Inventors: Casimer M. DeCusatis, Poughkeepsie, NY (US); Rajaram B. Krishnamurthy, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 14/132,143

(22) Filed: Dec. 18, 2013

(65) Prior Publication Data

US 2015/0172101 A1 Jun. 18, 2015

(51) Int. Cl.
 *H04L 12/24* (2006.01)
 *H04L 12/703* (2013.01)
 *H04L 12/26* (2006.01)
 *H04L 12/721* (2013.01)

(52) U.S. Cl.
 CPC ........ *H04L 41/0668* (2013.01); *H04L 43/0876* (2013.01); *H04L 45/28* (2013.01); *H04L 45/38* (2013.01)

(58) Field of Classification Search
 USPC ......................................................... 370/216
 See application file for complete search history.

(56) References Cited

U.S. PATENT DOCUMENTS

| | | | |
|---|---|---|---|
| 6,269,405 B1* | 7/2001 | Dutcher et al. | 709/248 |
| 8,819,344 B1* | 8/2014 | Faibish et al. | 711/147 |
| 2002/0007468 A1* | 1/2002 | Kampe et al. | 714/4 |
| 2011/0035754 A1 | 2/2011 | Srinivasan | |
| 2012/0096149 A1 | 4/2012 | Sunkara et al. | |
| 2014/0059225 A1* | 2/2014 | Gasparakis et al. | 709/226 |
| 2015/0117216 A1* | 4/2015 | Anand et al. | 370/236 |

* cited by examiner

*Primary Examiner* — Mark Rinehart
*Assistant Examiner* — Ellen A Kirillova
(74) *Attorney, Agent, or Firm* — Cantor Colburn LLP; Steven Chiu

(57) ABSTRACT

Embodiments relate to software-defined networking (SDN) disaster recovery. An aspect is a system that includes an SDN controller configured to interface with a plurality of servers and switches in a network. The SDN controller includes processing circuitry configured to perform a method that includes establishing a plurality of flows, by the SDN controller, between a plurality of switches and pairs of servers in a network, including at least two different pairs of server types. Each server type runs a different operating system and a different disaster recovery manager in an active/active configuration. Data migration is controlled, by the SDN controller, between the pairs of servers in the network. The SDN controller dynamically reallocates the flows between the switches and the pairs of servers in the network based on detecting a fault in the network.

5 Claims, 4 Drawing Sheets

400

402
Establish a plurality of flows between a plurality of switches and pairs of servers in a network, including at least two different pairs of server types, where each server type is running a different operating system and a different disaster recovery manager in an active/active configuration 404
Control data migration between the pairs of servers in the network 406
Dynamically reallocate the flows between the switches and the pairs of servers in the network based on detecting a fault in the network

SOFTWARE-DEFINED NETWORKING DISASTER RECOVERY

BACKGROUND

The present invention relates generally to software-defined networking, and more specifically, to a software-defined networking disaster recovery.

High-reliability storage systems typically use data replication to maintain a secondary copy of data stored in a primary volume. A systems complex, also referred to as a sysplex, is an example of a high-reliability system that allows multiple logical partitions to communicate and coordinate synchronized data storage and access for large-scale data storage and management. A parallel sysplex provides data sharing capabilities for accessing multiple databases to read and write as shared data. System members are synchronized using timers and a coupling facility for data sharing. A geographically dispersed parallel sysplex (GDPS) environment enables a parallel sysplex to be at geographically separate sites while maintaining coordinated data system management; however, the GDPS environment need not be geographically separated. A GDPS environment in combination with peer-to-peer remote copy (GDPS/PPRC) enables synchronous data mirroring using PPRC volume pairs (i.e., primary and secondary volumes) for systems that can be separated by substantial distances, e.g., 120 miles. PPRC is an example of a synchronous replication technology. In a two system configuration, GDPS/PPRC allows the systems at separate sites to be administered as a single system. In the event of a system or storage device failure, recovery can be initiated automatically with minimal or no data loss.

A data center can include a variety of systems and servers running different operating systems and workloads that may not be directly compatible. A cluster manager can use managed replication with linked clusters to manage backup and recovery operations in systems that are not compatible with a GDPS environment. Multiple system and server types make orchestration of disaster recovery operations difficult, particularly where some systems run in a GDPS environment and others do not.

SUMMARY

An aspect is a computer-implemented method for software-defined networking (SDN) disaster recovery. The method includes establishing a plurality of flows, by an SDN controller, between a plurality of switches and pairs of servers in a network, including at least two different pairs of server types. Each server type runs a different operating system and a different disaster recovery manager in an active/active configuration. Data migration is controlled, by the SDN controller, between the pairs of servers in the network. The SDN controller dynamically reallocates the flows between the switches and the pairs of servers in the network based on detecting a fault in the network.

Another aspect is a computer program product for SDN disaster recovery. The computer program product includes a tangible storage medium readable by a processing circuit and storing instructions for execution by the processing circuit for performing a method. The method includes establishing a plurality of flows, by an SDN controller, between a plurality of switches and pairs of servers in a network, including at least two different pairs of server types. Each server type runs a different operating system and a different disaster recovery manager in an active/active configuration. Data migration is controlled, by the SDN controller, between the pairs of servers in the network. The SDN controller dynamically reallocates the flows between the switches and the pairs of servers in the network based on detecting a fault in the network.

An aspect is a system for SDN disaster recovery that includes an SDN controller configured to interface with a plurality of servers and switches in a network. The SDN controller includes processing circuitry configured to perform a method that includes establishing a plurality of flows, by the SDN controller, between the switches and pairs of the servers in the network, including at least two different pairs of server types. Each server type runs a different operating system and a different disaster recovery manager in an active/active configuration. Data migration is controlled, by the SDN controller, between the pairs of servers in the network. The SDN controller dynamically reallocates the flows between the switches and the pairs of servers in the network based on detecting a fault in the network.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Exemplary embodiments include a system, method, and computer program product for software-defined networking (SDN) disaster recovery. An SDN controller is provided that manages both a physical and virtual infrastructure of a network and manages servers running different operating systems attached to the network. The SDN controller can access information such as server and network topology, available server input/output (I/O) bandwidth, and available network bandwidth. The SDN controller may use the information in order to prioritize and/or reallocate server and network resources programmatically by migrating workloads (i.e., applications) to available resources for continuity between a primary and secondary location. In order to manage servers in the network, the SDN controller can access management interfaces on the servers to insure that updates to a secondary server remain consistent with updates to a primary server for active/active server clusters. The SDN controller can also maintain records of states for affected data sets on the servers.

Rather than running separate networks and requiring servers of different server types (e.g., different hardware and operating systems configurations) to know protocol and processing details about each other, the SDN controller acts as a network manager and data mover for the servers. The SDN controller can manage and control application-aware network traffic flows in a network in which several applications are running on servers at substantially the same time. An application running in the network is referred to as a workload. The servers and network resources, such as switches, may be referred to generally as nodes of the network, where network traffic is routed through a number of intermediate nodes between network endpoints forming a flow or flow path. The system provides visibility of network traffic flows to SDN control logic, which is a program executed in an SDN controller that allocates bandwidth and resources. The SDN controller can also establish priority on a per-workload basis based on flow classification. Header information in network traffic can be used to classify flows based on source, destination, protocol, and other such information.

Figure 1:
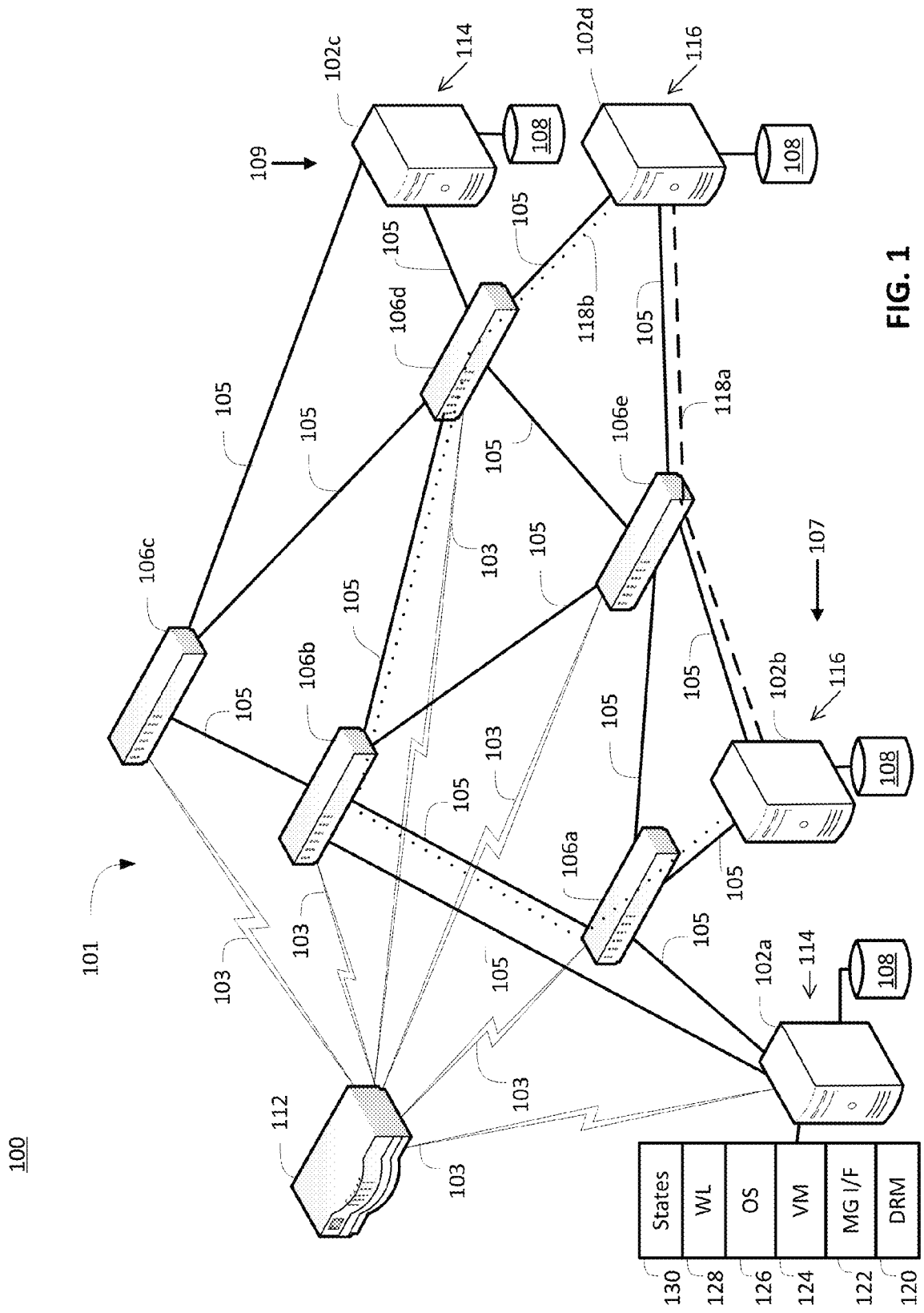
FIG. 1 depicts a system for software-defined networking (SDN) disaster recovery in accordance with an embodiment.

Turning now to FIG. 1, an example of a system 100 including a network 101 that supports software-defined networking (SDN) will now be described in greater detail. In the example depicted in FIG. 1, the system 100 includes a plurality of servers 102 configured to communicate over the network 101 using switches 106 that are SDN-capable, e.g., OpenFlow-compatible. In FIG. 1, five switches 106a, 106b, 106c, 106d, and 106e are depicted for purposes of explanation; however, the scope of embodiments is not so limited and may include any number of switches 106. The network 101 can be geographically distributed between multiple physical locations including a first geographic location 107 (e.g., a primary location) and a second geographic location 109 (e.g., a secondary location). The network 101 can also include other systems and access points (not depicted), such as client systems and firewalls for local and/or external network access.

In exemplary embodiments, the servers 102, also referred as hosts or host systems, are high-speed processing devices (e.g., mainframe computers, desktop computers, laptop computers, hand-held devices, embedded computing devices, or the like) including at least one processing circuit (e.g., a computer processor/CPU) capable of reading and executing instructions, and handling interactions with various components of the system 100. One or more of the servers 102 may be storage system servers configured to access and store large amounts of data 108.

In the example of FIG. 1, the first geographic location 107 includes a first primary server 102a and second primary server 102b, and the second geographic location 109 includes a first secondary server 102c and a second secondary server 102d. The first primary server 102a and the first secondary server 102c form a first pair of servers 114, and the second primary server 102b and the second secondary server 102d form a second pair of servers 116. In an exemplary embodiment, the first pair of servers 114 and the second pair of servers 116 each has a different server type. For example, the first primary server 102a and the first secondary server 102c may be System z servers, while the second primary server 102b and the second secondary server 102d may be Linux, UNIX, or Windows systems.

Multiple links 105 that can collectively form flows 118 may be provided between the servers 102a-d and switches 106a-e. For instance, between the first pair of servers 114 an active flow can be established as an operating connection that includes multiple active links 105 and a backup flow can be established that as a backup connection includes multiple backup links 105 such that upon detecting a fault in the active flow, the backup flow can be reallocated as the active flow. An example of this is depicted in FIG. 1 for the second pair of servers 116, where an active flow 118a is established as an operating connection for active links 105 between the second primary server 102b, switch 106e, and the second secondary server 102d. A backup flow 118b is established as a backup connection for backup links 105 between the second primary server 102b, switch 106a, switch 106b, switch 106d, and the second secondary server 102d. If switch 106e fails, then existing network traffic flowing on the backup flow 118b can be dropped and network traffic from the active flow 118a may be reallocated to the backup flow 118b such that the backup flow 118b becomes a new active flow for the second pair of servers 116. The backup flow 118b may have a lower network bandwidth allocation than the active flow 118a. Therefore, upon reallocation of the backup flow 118b, additional network bandwidth may be added, e.g., provisioning additional links 105 if available.

Each of the servers 102a-d can include a disaster recovery manager (DRM) 120, management interface 122, a virtual machine 124, an operating system 126, a workload 128, and states 130. Although only a single instance of the disaster recovery manager 120, management interface 122, virtual machine 124, operating system 126, workload 128, and states 130 is depicted for the first primary server 102a in FIG. 1, it will be understood that each of the servers 102a-d can include one or more instances of the disaster recovery manager 120, management interface 122, virtual machine 124, operating system 126, workload 128, and states 130. The disaster recovery manager 120 may be of a first type for the first pair of servers 114 and of a second type for the second pair of servers 116. In one embodiment, a first disaster recovery manager 120 of the first pair of servers 114 is a geographically dispersed parallel sysplex (GDPS) with a System Data Mover, and a first operating system 126 of the first pair of servers 114 is IBM z/OS. A second disaster recovery manager 120 of the second pair of servers 116 may be a Veritas Cluster Manager, and a second operating system 126 of the second pair of servers 116 may be, for example, a Linux, UNIX, or Windows operating system (also referred to generally as K-Systems). The disaster recovery manager 120 may operate in an active/active configuration across the first and second pairs of servers 114 and 116. In an active/active configuration, continuous availability with disaster recovery is supported based on two or more sites (e.g., geographic locations 107, 109) running substantially the same applications (e.g., one or more workloads 128) and having substantially the same data 108 to provide cross-site workload balancing.

The management interface 122 can provide access to the states 130 that define information about the workload 128 and data 108, such as content information and when each was last updated. Accordingly, comparing the states 130 across the primary and secondary servers 102a, 102c or 102b, 102d can assist in identifying differences that indicate updating of the respective secondary server 102c or 102d is needed. The management interfaces 122 can also expose server input/output bandwidth information. In an embodiment, a same version and type of the operating system 126 is run on both the first primary server 102a and the first secondary server 102c, while a different operating system 126 is run on the second pair of servers 116 such that server-initiated data movement may be difficult from the first pair of servers 114 to the second pair of servers 116.

The system 100 also includes an SDN controller 112 that is a central software-defined network controller configured to make routing and data movement decisions within the network 101. The SDN controller 112 establishes secure links 103 to configure the switches 106 and communication properties of links 105 between the switches 106. For example, the SDN controller 112 can configure the switches 106 to control packet routing paths for data flows between the servers 102. The SDN controller 112 can also configure the switches 106 to define flows between the servers 102, virtual machines 124, operating systems 126, and workloads 128 running on the servers 102. One or more secure links 103 may also be defined between the SDN controller 112 and the servers 102 to provide the SDN controller 112 with access to the management interface 122 and states 130, among other resources.

The servers 102 and SDN controller 112 can include various computer/communication hardware and software technology known in the art, such as one or more processing units or circuits, volatile and non-volatile memory including removable media, power supplies, network interfaces, support circuitry, operating systems, and the like. Although the SDN controller 112 is depicted as a separate component, it will be understood that SDN controller functionality can alternatively be implemented in one or more of the servers 102.

The network 101 can include a combination of wireless, wired, and/or fiber optic links. The network 101 as depicted in FIG. 1 represents a simplified example for purposes of explanation. For example, each of the links 105 depicted in the network 101 can include more than one physical link. Embodiments of the network 101 can include numerous switches 106 (e.g., hundreds) with dozens of ports and links per switch 106. The switches 106 are also referred to generally as network resources and may represent any type of device that is capable of forwarding data through one or more ports. The network 101 may support a variety of known communication standards that allow data to be transmitted between the servers 102, switches 106, and/or SDN controller 112. Communication protocols are typically implemented in one or more layers, such as a physical layer (layer-1), a link layer (layer-2), a network layer (layer-3), a transport layer (layer-4), and an application layer (layer-5). In exemplary embodiments, the network 101 supports SDN as a layer-2 protocol. The switches 106 can be dedicated SDN switches or SDN-enabled general purpose switches that also support layer-2 and layer-3 Ethernet.

Figure 2:
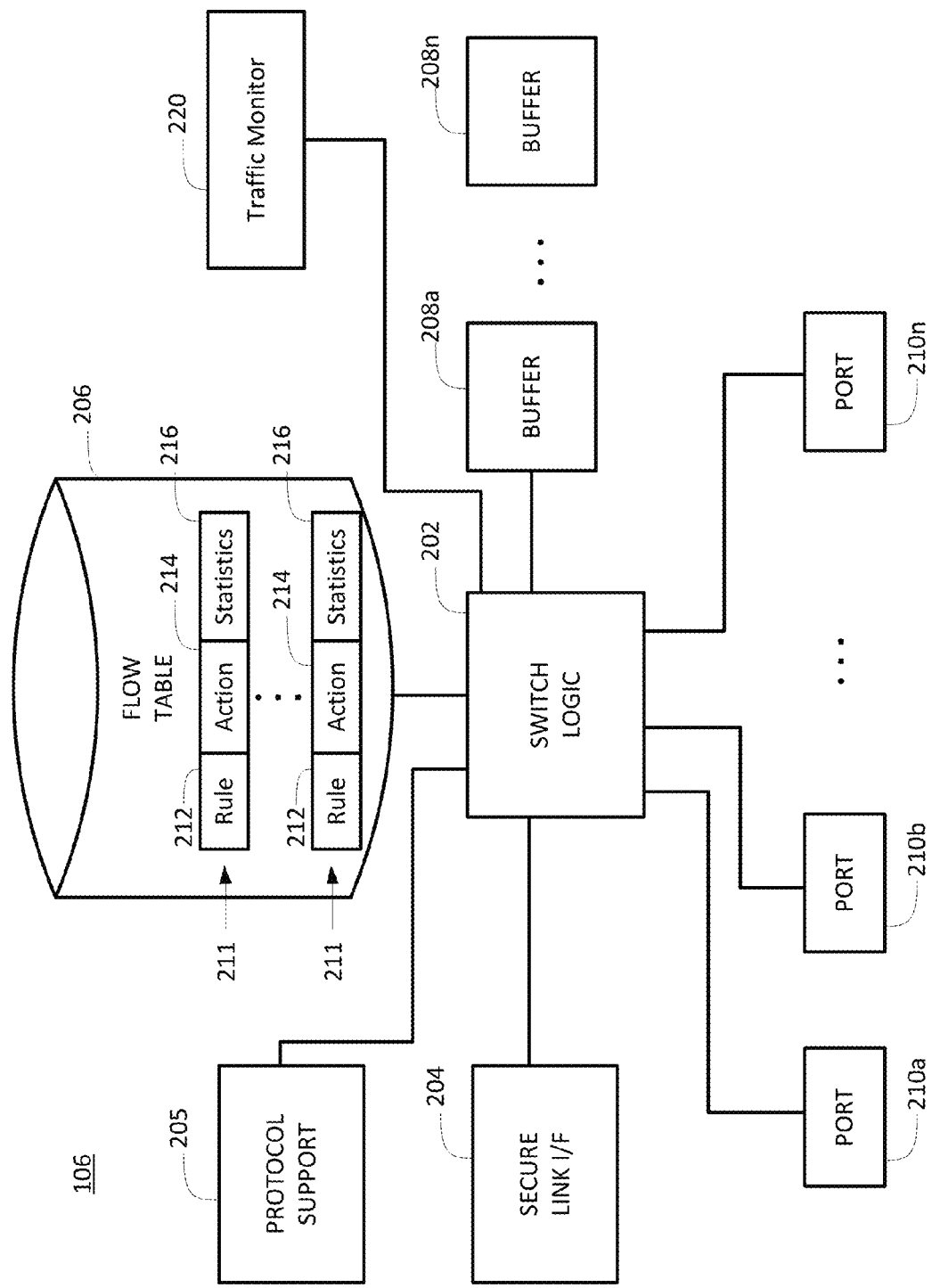
FIG. 2 depicts a block diagram of a switch of the system of FIG. 1 according to an embodiment.

FIG. 2 depicts a block diagram of one of the switches 106a-e of FIG. 1 that supports SDN as switch 106. The switch 106 of FIG. 2 includes switch logic 202, secure link interface 204, protocol support 205, flow table 206, buffers 208a-208n, and ports 210a-210n. The switch 106 can also include traffic monitor 220 to monitor network traffic locally to determine network traffic performance metrics and provide the network traffic performance metrics to the SDN controller 112 of FIG. 1. The switch logic 202 may be implemented in one or more processing circuits, where a computer readable storage medium is configured to hold instructions for the switch logic 202 and/or the traffic monitor 220, as well as various variables and constants to support operation of the switch 106. The switch logic 202 forwards network traffic (e.g., packets) between the ports 210a-210n as flows defined by the SDN controller 112 of FIG. 1.

The secure link interface 204 connects the switch 106 to the SDN controller 112 via a secure link 103 of FIG. 1. The secure link interface 204 allows commands and packets to be communicated between the SDN controller 112 and the switch 106 using an SDN protocol. The secure link interface 204 can be controlled by executable instructions stored within the switch 106. Protocol details to establish a protocol definition for an implementation of SDN and other protocols can be stored in the protocol support 205. The protocol support 205 may be software that defines one or more supported protocol formats. The protocol support 205 can be embodied in a computer readable storage medium, for instance, flash memory, which is configured to hold instructions for execution by the switch logic 202. Implementing the protocol support 205 as software enables updates in the field for new versions or variations of protocols and can provide SDN as an enhancement to existing conventional routers or switches.

The flow table 206 defines supported connection types associated with particular addresses, virtual local area networks or switch ports, for example. A flow may be defined as all network traffic that matches a particular header format, including use of wildcards. Each entry 211 in the flow table 206 can include one or more rules 212, actions 214, and statistics 216 associated with a particular flow. The rules 212 define each flow and can be determined by packet headers. The actions 214 define how packets are processed. The statistics 216 track information such as the size of each flow (e.g., number of bytes), the number of packets for each flow, and time since the last matching packet of the flow or connection time. Examples of actions include instructions for forwarding packets of a flow to one or more specific ports 210a-210n (e.g., unicast or multicast), encapsulating and forwarding packets of a flow to the SDN controller 112 of FIG. 1, and dropping packets of the flow. Entries 211 in the flow table 206 can be added and removed by the SDN controller 112 of FIG. 1 via the secure link interface 204. The SDN controller 112 of FIG. 1 can pre-populate the entries 211 in the flow table 206. Additionally, the switch 106 can request creation of an entry 211 from the SDN controller 112 upon receiving a flow without a corresponding entry 211 in the flow table 206.

The buffers 208a-208n provide temporary storage in queues for flows as network traffic is sent between the ports 210a-210n. In a lossless configuration, rather than dropping packets of network traffic when network congestion is present, the buffers 208a-208n temporarily store packets until the associated ports 210a-210n and links 105 of FIG. 1 are available. Each of the buffers 208a-208n may be associated with a particular port, flow, or sub-network. Each of the buffers 208a-208n is logically separate but need not be physically independent. Accordingly, when one of the buffers 208a-208n is full, it does not adversely impact the performance of the other buffers 208a-208n within the switch 106.

Figure 3:
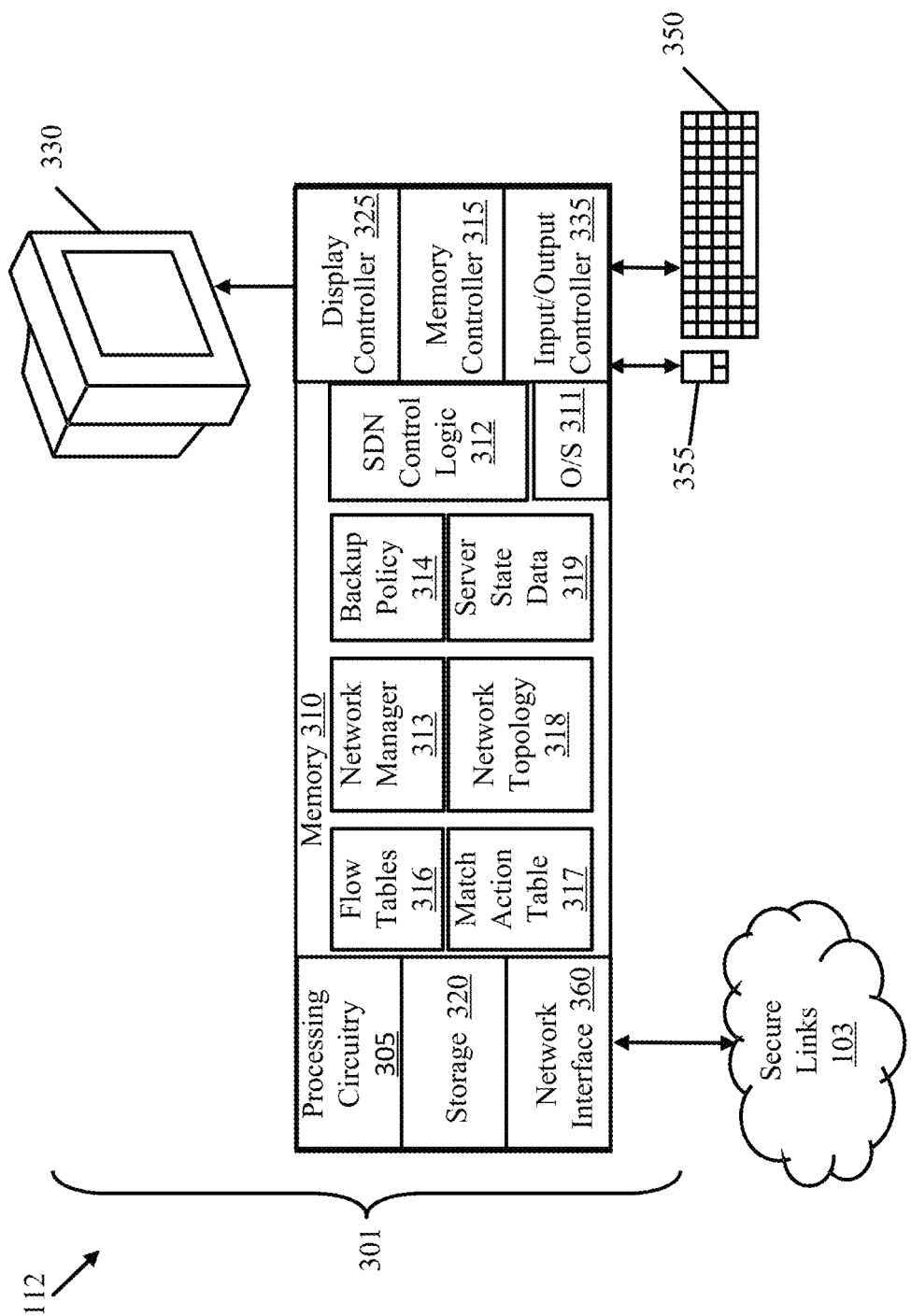
FIG. 3 depicts a block diagram of an SDN controller of the system of FIG. 1 in accordance with an embodiment.

FIG. 3 depicts a block diagram of the SDN controller 112 of FIG. 1 according to an embodiment. The SDN controller 112 can be embodied in any type of processing system and is depicted embodied in a general-purpose computer 301 in FIG. 3. The servers 102a-d of FIG. 1 can also include similar computer elements as depicted in the computer 301 of FIG. 3.

In an exemplary embodiment, in terms of hardware architecture, as shown in FIG. 3, the computer 301 includes processing circuitry 305 and memory 310 coupled to a memory controller 315, and an input/output controller 335. The input/output controller 335 can be, for example but not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the computer 301 may include address, control, and/or data connections to enable appropriate communications among the aforementioned components.

In an exemplary embodiment, a conventional keyboard 350 and mouse 355 or similar devices can be coupled to the input/output controller 335. Alternatively, input may be received via a touch-sensitive or motion sensitive interface (not depicted). The computer 301 can further include a display controller 325 coupled to a display 330.

The processing circuitry 305 is a hardware device for executing software, particularly software stored in storage 320, such as cache storage, or memory 310. The processing circuitry 305 can be any custom made or commercially available computer processor, a central processing unit (CPU), an auxiliary processor among several processors associated with the computer 301, a semiconductor-based microprocessor (in the form of a microchip or chip set), a macro-processor, or generally any device for executing instructions.

The memory 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), disk, hard disk drive, diskette, cartridge, cassette or the like, etc.). Moreover, the memory 310 may incorporate electronic, magnetic, optical, and/or other types of storage media. Accordingly, the memory 310 is an example of a tangible computer readable storage medium upon which instructions executable by the processing circuitry 305 may be embodied as a computer program product. The memory 310 can have a distributed architecture, where various components are situated remote from one another, but can be accessed by the processing circuitry 305.

The instructions in memory 310 may include one or more separate programs, each of which comprises an ordered listing of executable instructions for implementing logical functions. In the example of FIG. 3, the instructions in the memory 310 include a suitable operating system (OS) 311, SDN control logic 312, and a network manager 313. The operating system 311 essentially controls the execution of other computer programs and provides scheduling, input-output control, file and data management, memory management, and communication control and related services. Although depicted separately, the SDN control logic 312 and network manager 313 can be combined or further subdivided. When the computer 301 is in operation, the processing circuitry 305 is configured to execute instructions stored within the memory 310, to communicate data to and from the memory 310, and to generally control operations of the computer 301 pursuant to the instructions.

In an exemplary embodiment, the computer 301 can further include a network interface 360 for coupling to the secure links 103 of the network 101 of FIG. 1. The network interface 360 and components of the network 101 of FIG. 1 can be configured by the SDN control logic 312 according to flow tables 316, a match action table 317, a network topology 318, a backup policy 314, and server state data 319. The network topology 318 defines characteristics of the network 101 of FIG. 1, such as network resource details (e.g., bandwidth, physical connections available, virtual connections, resource constraints) of the servers 102, links 105, and switches 106 of FIG. 1. The flow tables 316 can be created based on the network topology 318 and modified by the network manager 313. The flow tables 316 can be defined for each of the switches 106 of FIG. 1 and deployed as instances of the flow table 206 of FIG. 2 including mapping to specific ports 210a-210n of FIG. 2. The match action table 317 can be used to define specific conditions for the actions 214 in the flow table 206 of FIG. 2 and link flows across multiple switches 106 of FIG. 1. The match action table 317 may include rules for particular internet protocol (IP) addresses, media access control (MAC) addresses, virtual machine identifiers (e.g., for virtual machine 124), operating system identifiers (e.g., for operating system 126) and/or workload identifiers (e.g., for workload 128), and match associated actions across the flow tables 316.

Upon detecting or receiving network traffic performance metrics from instances of the traffic monitor 220 of FIG. 2, the network manager 313 can modify one or more of the flow tables 316, match action table 317, and network topology 318 to improve overall performance of the network 101 of FIG. 1. Accordingly, the network manager 313 can update the flow tables 316, match action table 317, and network topology 318 to reflect differing data flow needs for backup, failure, and recovery events. For instance, the match action table 317 may include time-based rules to increase bandwidth during scheduled backup events. The backup policy 314 may define when data 108 of FIG. 1 should be moved between the servers 102a-d of FIG. 1.

In an embodiment, the network manager 313 integrates functions from multiple different disaster recovery managers 120 of FIG. 1 (e.g., a first disaster recovery manager 120 of the first pair of servers 114 and a second disaster recovery manager 120 of the second pair of servers 116) to determine which connections between the servers are available and prioritized for use as backup or operating connections. The network manager 313 may incorporate data movement features of the disaster recovery managers 120 of FIG. 1, such as active/active system management, to use both primary servers 102a, 102b, and secondary servers 102c, 102d until a failure occurs, upon which a backup/secondary workload 128 is dropped at the corresponding secondary server 102c, 102d in favor of a higher priority primary workload 128 from a corresponding primary server 102a, 102b.

The server state data 319 can be collected by the network manager 313 through accessing the states 130 of FIG. 1 via the management interface 122 of each of the servers 102a-d of FIG. 1. The network manager 313 can compare the server state data 319 for the first and second server pairs 114 and 116 of FIG. 1 and determine whether an update is needed due to state differences. When it is determined that an update is needed, data movement can be scheduled according to the backup policy 314. The network manager 313 may also monitor input/output bandwidth of the servers 102a-d of FIG. 1 and reallocate data 108 based on detecting an imbalance in the input/output bandwidth, including movement of data between servers 102 with different operating systems 126 at a same geographic location. The network manager 313 may also manage workload 128 migration between the servers 102a-102d of FIG. 1.

Figure 4:
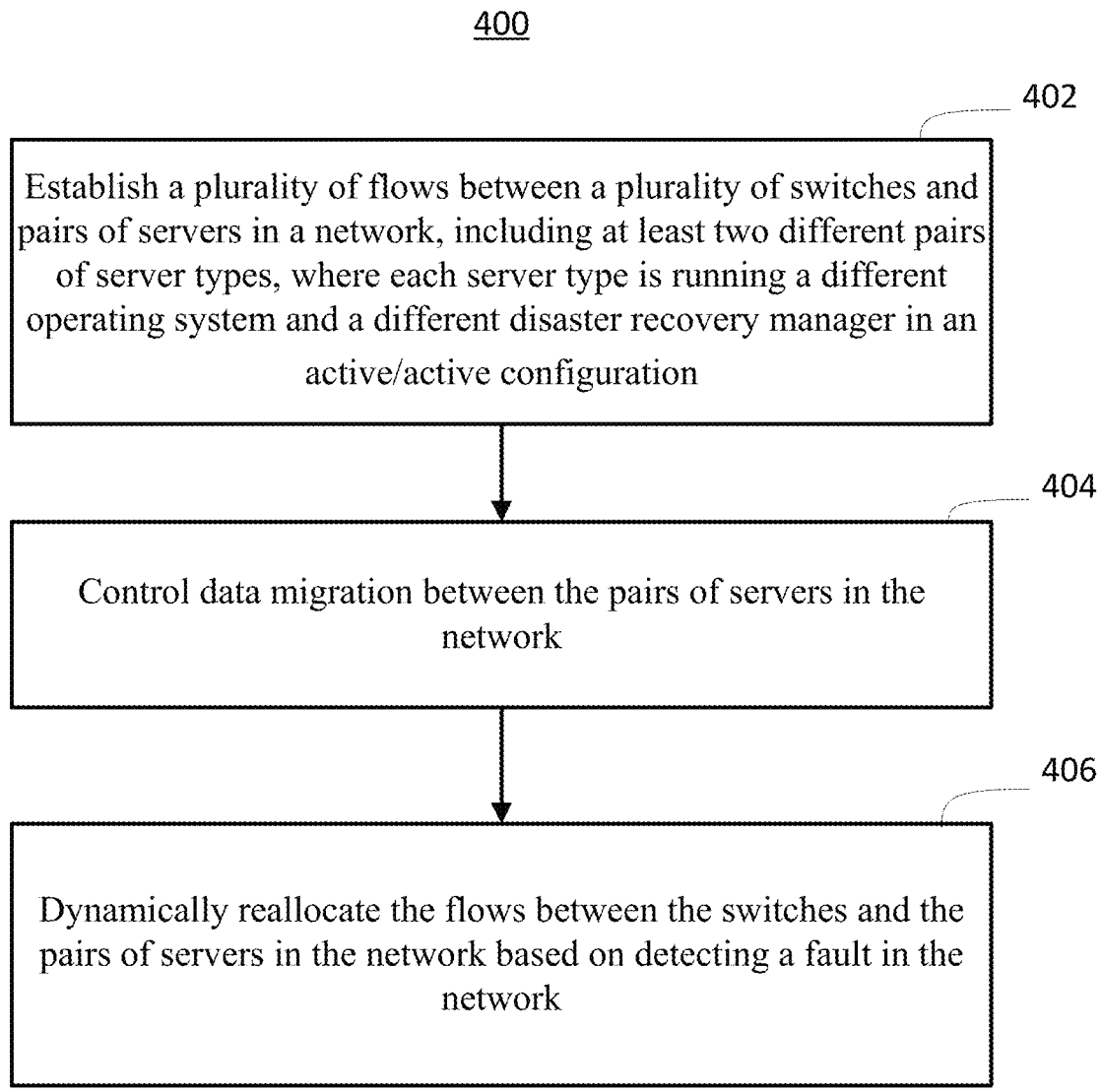
FIG. 4 depicts a process flow for SDN disaster recovery in accordance with an embodiment.

FIG. 4 depicts a process 400 for providing SDN disaster recovery as a computer-implemented method in accordance with an embodiment. The process 400 is also described in reference to FIGS. 1-3 and can be implemented by the system 100 of FIG. 1.

At block 402, the SDN controller 112 establishes a plurality of flows 118 between a plurality of switches 106 and pairs of servers 114, 116 in the network 101, including at least two different pairs of server types. Each server type runs a different operating system 126 and a different disaster recovery manager 120 in an active/active configuration.

At block 404, the SDN controller 112 controls data 108 migration between the pairs of servers 114, 116 in the network 101. The SDN controller 112 can also manage workload 128 migration between the servers 102 and adjust the flows 118 based on network traffic and data movement requirements between the servers 102.

At block 406, the SDN controller 112 dynamically reallocates the flows 118 between the switches 106 and the pairs of servers 114, 116 in the network 101 based on detecting a fault in the network 101. The SDN controller 112 may analyze a plurality of links 105 between the switches 106 and the servers 102 to identify active links 105 and backup links 105. The SDN controller 112 can establish an active flow 118a as an operating connection including a plurality of the active links 105 between a first pair of the servers 114, and a backup flow 118b as a backup connection including a plurality of the backup links 105 between the first pair of the servers 114. Based on detecting a fault in the active flow 118a, the backup flow 118b can be reallocated as the active flow. The same process can be followed for the second pair of servers 116.

The SDN controller 112 can identify a primary server 102a and a secondary server 102c in one of the pairs of servers 114 and access management interfaces 122 of the primary and secondary servers 102a, 102c to retrieve states 130 of the primary and secondary servers 102a, 102c. Records of the states 130 can be stored in the SDN controller 112 as server state data 319. The SDN controller 112 may compare the states 130 to identify state differences between the primary and secondary servers 102a, 102c. The SDN controller 112 may move data 108 from the primary server 102a to the secondary server 102c based on determining that an update of the secondary server 102c is needed due to the state differences.

The SDN controller 112 can identify a first pair of the servers 114 including a first primary server 102a and a first secondary server 102c of a first server type, and a second pair of the servers 116 including a second primary server 102b and a second secondary server 102d of a second server type. The first and second primary servers 102a, 102b may be at a first geographic location 107 and the first and second secondary servers 102c, 102d can be at a second geographic location 109. The SDN controller 112 may also monitor input/output bandwidth of the servers 102 and reallocate data 108 between the servers 102 based on detecting an imbalance in the input/output bandwidth. Reallocation by the SDN controller 112 can include reallocating the data 108 between the first and second primary servers 102a, 102b and replicating the reallocating, by the SDN controller 112, between the first and second secondary servers 102c, 102d.

Technical effects and benefits include providing disaster recovery using a software-defined networking controller.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for software-defined networking (SDN) disaster recovery, the system comprising:
   an SDN controller configured to interface with a plurality of servers and switches in a network, the SDN controller comprising processing circuitry configured to perform a method comprising:
      establishing a plurality of flows, by the SDN controller, between the switches and pairs of the servers in the network, including at least two different pairs of server types, wherein each server type runs a different operating system and a different disaster recovery manager in an active/active configuration;
      controlling data migration, by the SDN controller, between the pairs of the servers in the network;
      dynamically reallocating the flows, by the SDN controller, between the switches and the pairs of the servers in the network based on detecting a fault in the network;
      identifying, by the SDN controller, a first pair of the servers comprising a first primary server and a first secondary server of a first server type, and a second pair of the servers comprising a second primary server and a second secondary server of a second server type, wherein the first and second primary servers are at a first geographic location and the first and second secondary servers are at a second geographic location;
      reallocating, by the SDN controller, data between the first and second primary servers; and
      replicating the reallocating, by the SDN controller, between the first and second secondary servers.

2. The system of claim 1, wherein the SDN controller integrates functions from a first and second disaster recovery manager to determine which connections between the servers are available and prioritized for use as backup or operating connections, and the SDN controller is further configured to perform:
   analyzing, by the SDN controller, a plurality of links between the switches and the servers to identify active links and backup links;
   establishing, by the SDN controller, an active flow as an operating connection comprising a plurality of the active links between a first pair of the servers;
   establishing, by the SDN controller, a backup flow as a backup connection comprising a plurality of the backup links between the first pair of the servers; and
   based on detecting a fault in the active flow, reallocating the backup flow as the active flow.

3. The system of claim 1, wherein the SDN controller is further configured to perform:
   identifying, by the SDN controller, a primary server and a secondary server in one of the pairs of servers;
   accessing, by the SDN controller, management interfaces of the primary and secondary servers to retrieve states of the primary and secondary servers;
   storing records of the states as state data in the SDN controller;
   comparing, by the SDN controller, the states to identify state differences between the primary and secondary servers; and
   moving data, by the SDN controller, from the primary server to the secondary server based on determining that an update of the secondary server is needed due to the state differences.

4. The system of claim 1, wherein the SDN controller is further configured to perform:
   monitoring, by the SDN controller, input/output bandwidth of the servers; and
   reallocating, by the SDN controller, data between the servers based on detecting an imbalance in the input/output bandwidth.

5. The system of claim 1, wherein the SDN controller is further configured to perform:
   managing workload migration, by the SDN controller, between the servers; and
   adjusting the flows, by the SDN controller, based on network traffic and data movement requirements between the servers.

* * * * *